United States Patent
Park et al.

(10) Patent No.: US 11,487,558 B2
(45) Date of Patent: Nov. 1, 2022

(54) ELECTRONIC DEVICE AND SCREEN SHARING METHOD USING SAME

(71) Applicant: Samsung Electronics Co., Ltd., Gyeonggi-do (KR)

(72) Inventors: Sang Woo Park, Gyeonggi-do (KR); Jae Won Nam, Gyeonggi-do (KR); Won Seok Kang, Gyeonggi-do (KR); Eun Kyu Lee, Gyeonggi-do (KR); Won Bae Lim, Gyeonggi-do (KR); Soo Hwan Chae, Gyeonggi-do (KR); Mee Ryung Choi, Gyeonggi-do (KR); Eu Jin Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/756,992

(22) PCT Filed: Nov. 6, 2018

(86) PCT No.: PCT/KR2018/013349
§ 371 (c)(1),
(2) Date: Apr. 17, 2020

(87) PCT Pub. No.: WO2019/088793
PCT Pub. Date: May 9, 2019

(65) Prior Publication Data
US 2021/0042132 A1    Feb. 11, 2021

(30) Foreign Application Priority Data

Nov. 6, 2017  (KR) .................. 10-2017-0146579

(51) Int. Cl.
*G06F 3/0482*      (2013.01)
*G06F 9/451*       (2018.01)
(Continued)

(52) U.S. Cl.
CPC ............ *G06F 9/452* (2018.02); *G06F 3/0482* (2013.01); *G06F 3/0484* (2013.01);
(Continued)

(58) Field of Classification Search
CPC ...... G06F 9/452; G06F 3/0484; G06F 3/0482; G06F 3/1438; G06F 2203/04803;
(Continued)

(56) References Cited

U.S. PATENT DOCUMENTS

2008/0229202 A1   9/2008  Fang et al.
2011/0181492 A1   7/2011  Soeda
(Continued)

FOREIGN PATENT DOCUMENTS

JP    2000-35847 A      2/2000
KR    10-2011-0107058 A  9/2011
(Continued)

OTHER PUBLICATIONS

European Search Report dated Jul. 17, 2020.
Korean Search Report dated Dec. 21, 2021.

*Primary Examiner* — Dino Kujundzic
*Assistant Examiner* — Jianmei F Duckworth
(74) *Attorney, Agent, or Firm* — Cha & Reiter, LLC

(57) ABSTRACT

The present invention relates to an electronic device and a screen sharing method using same. An electronic device according to various embodiments of the present invention comprises a communication circuit, a touch screen display, an audio processing circuit, memory and a processor which is electrically connected to the communication circuit, the touch screen display, the audio processing circuit and the memory. The processor can be configured so as to display a first screen and a second screen on the touch screen display, recognize an external electronic device connected by means of the communication circuit if an input for performing a
(Continued)

screen sharing function is detected by means of the touch screen display, and transmit, to the recognized external electronic device, the first screen and/or the second screen and at least one audio signal among audio signals corresponding to the first screen and the second screen. Other various embodiments other than the various embodiments disclosed in the present invention are possible.

11 Claims, 11 Drawing Sheets

(51) Int. Cl.
*G06F 3/0484* (2022.01)
*G06F 3/14* (2006.01)
*H04L 65/60* (2022.01)
*H04L 67/10* (2022.01)
*G09G 5/14* (2006.01)
*G09G 5/00* (2006.01)
*G06F 3/041* (2006.01)
*G06F 3/16* (2006.01)

(52) U.S. Cl.
CPC ............ *G06F 3/1438* (2013.01); *H04L 65/60* (2013.01); *H04L 67/10* (2013.01); *G06F 3/041* (2013.01); *G06F 3/14* (2013.01); *G06F 3/1454* (2013.01); *G06F 3/16* (2013.01); *G06F 3/165* (2013.01); *G06F 2203/04803* (2013.01); *G09G 5/006* (2013.01); *G09G 5/14* (2013.01); *G09G 2352/00* (2013.01); *G09G 2354/00* (2013.01); *G09G 2370/04* (2013.01); *G09G 2370/16* (2013.01); *G09G 2370/20* (2013.01)

(58) Field of Classification Search
CPC .......... G06F 3/1454; G06F 3/041; G06F 3/14; G06F 3/16; G06F 3/165; H04L 65/60; H04L 67/10; G09G 2370/04; G09G 5/006; G09G 2352/00; G09G 2354/00; G09G 2370/16; G09G 2370/20; G09G 5/14

USPC ........................................................ 715/761
See application file for complete search history.

(56) References Cited

U.S. PATENT DOCUMENTS

| | | | |
|---|---|---|---|
| 2012/0054613 A1* | 3/2012 | Yoo ................... | H04M 1/72442 715/716 |
| 2012/0060109 A1* | 3/2012 | Han ................... | H04M 1/72412 715/769 |
| 2013/0050230 A1 | 2/2013 | Jeong et al. | |
| 2013/0278484 A1 | 10/2013 | Hwang et al. | |
| 2014/0282229 A1 | 9/2014 | Laukkanen et al. | |
| 2014/0365923 A1 | 12/2014 | Lee et al. | |
| 2015/0120817 A1* | 4/2015 | Jeong ................... | G06F 3/1454 709/203 |
| 2015/0195601 A1 | 7/2015 | Hahm et al. | |
| 2016/0110152 A1* | 4/2016 | Choi ....................... | G09G 5/006 345/2.3 |
| 2016/0173683 A1* | 6/2016 | Abreu ..................... | H04L 51/24 455/414.1 |
| 2016/0183326 A1 | 6/2016 | Son et al. | |
| 2016/0253142 A1 | 9/2016 | Choi et al. | |
| 2016/0255398 A1* | 9/2016 | Lee ......................... | H04L 65/00 348/462 |
| 2018/0035072 A1* | 2/2018 | Asarikuniyil ........... | H04S 7/303 |
| 2019/0081993 A1* | 3/2019 | Shim .................... | G06F 3/04845 |

FOREIGN PATENT DOCUMENTS

| | | |
|---|---|---|
| KR | 10-2013-0021614 A | 3/2013 |
| KR | 10-2013-0119172 A | 10/2013 |
| KR | 10-2014-0143971 A | 12/2014 |
| KR | 10-2015-0082949 A | 7/2015 |
| KR | 10-2016-0092363 A | 8/2016 |
| KR | 10-2016-0105242 A | 9/2016 |
| KR | 10-1772076 B1 | 8/2017 |

* cited by examiner

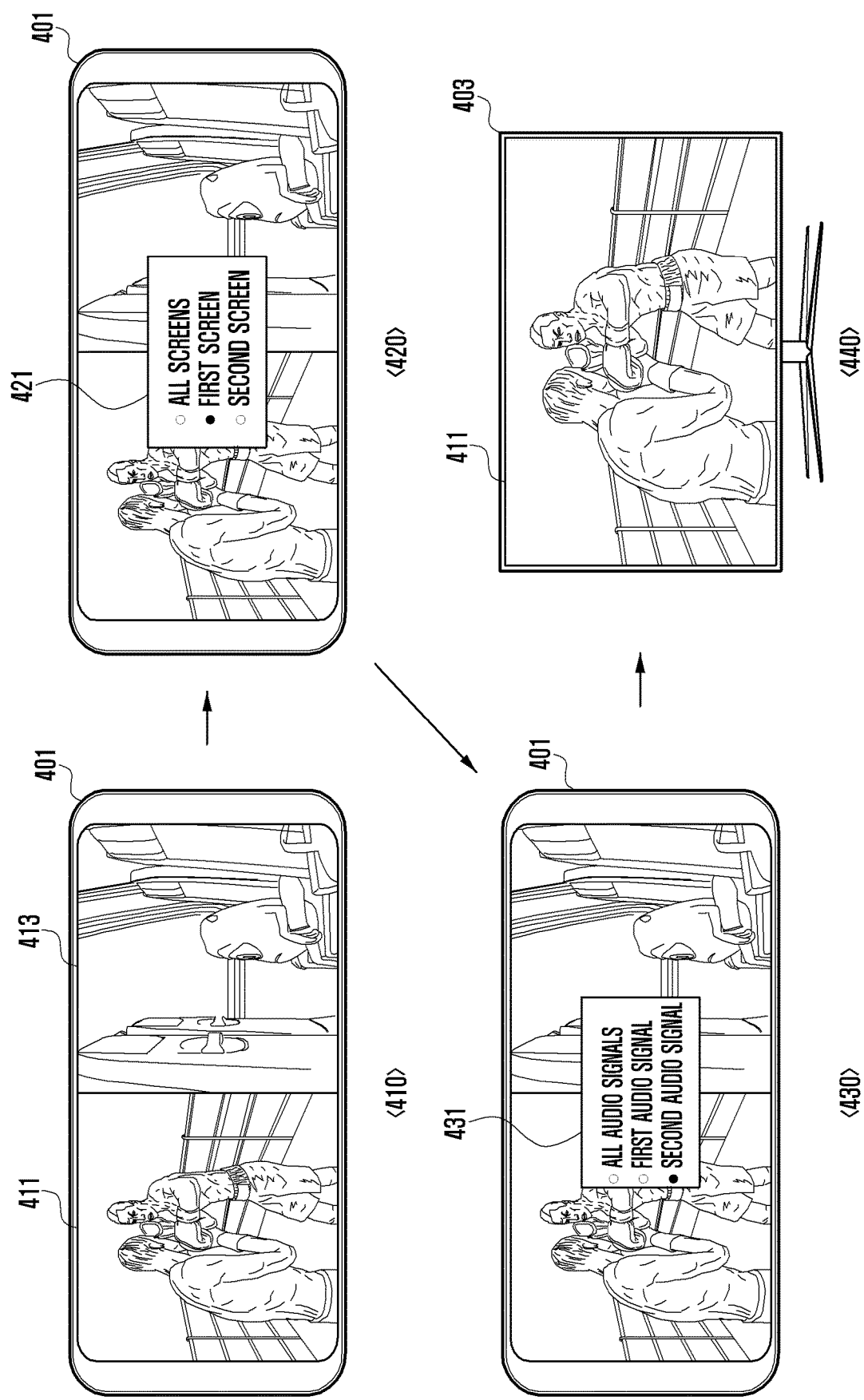

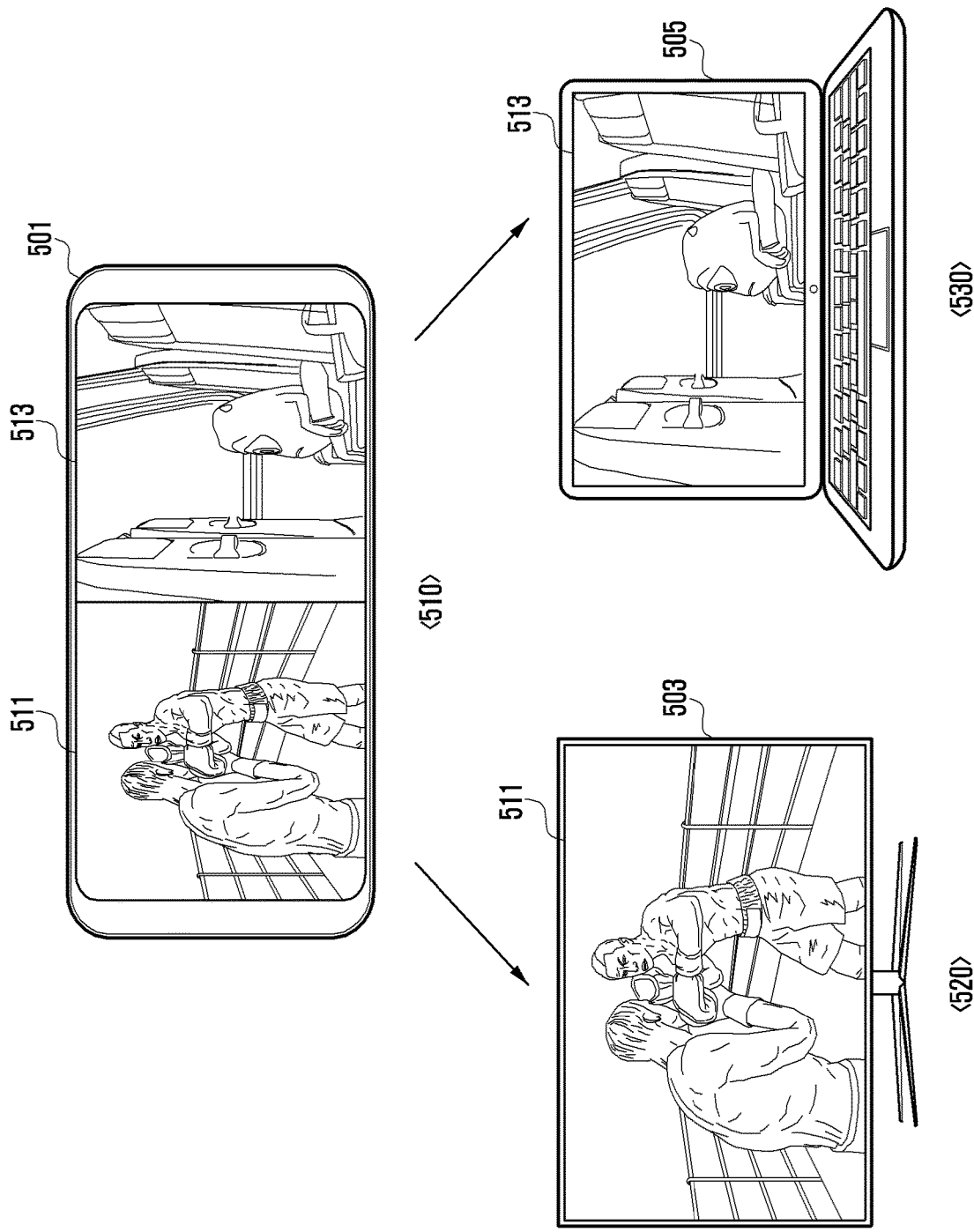

ELECTRONIC DEVICE AND SCREEN SHARING METHOD USING SAME

CROSS REFERENCE TO RELATED APPLICATIONS

This application is a National Phase Entry of PCT International Application No. PCT/KR2018/013349, which was filed on Nov. 6, 2018, and claims a priority to Korean Patent Application No. 10-2017-0146579, which was filed on Nov. 6, 2017, the contents of which are incorporated herein by reference.

TECHNICAL FIELD

The disclosure relates to an electronic device and a method of sharing a screen using the same.

BACKGROUND ART

Electronic devices may transmit and receive various pieces of data to and from external electronic devices through a wired/wireless communication function and use a screen sharing technology (for example, a mirroring technology) through which a screen displayed in the electronic device can be displayed in the external electronic device. The screen sharing technology is a technology by which a plurality of electronic devices having a display can share screen data. An image displayed on a display of the electronic device may be transmitted to an external electronic device in a peer to peer (P2P) manner using short-range wireless communication, such as Wi-Fi, and the external electronic device may display the received image simultaneously with the electronic device.

DETAILED DESCRIPTION OF INVENTION

Technical Problem

If screen data is shared with an external electronic device through the screen sharing technology in the state in which a plurality of screens are displayed on a display of an electronic device in a multi-window form, all of the plurality of screens may be displayed on the external electronic device. Further, if the plurality of screens includes audio signals, all of the audio signals may also be shared when the screen data is shared with the external electronic device.

Accordingly, a user who desires to display only a specific screen rather than all of a plurality of screens on the external electronic device and to output only a specific audio signal may feel inconvenience.

Further, if a function corresponding to an event (for example, a message event or a call event) received while screen data is shared with the external electronic device, an operation of sharing the screen data with the external electronic device may be stopped.

An electronic device according to various embodiments of the disclosure may provide only some screens among a plurality of screens displayed on a display in a multi-window form to share the same with an external electronic device. Further, the electronic device may provide only some of the screens with the external electronic device and only an audio signal selected by the user to share the same with the external electronic device.

If an event is received while screen data is shared with the external electronic device, the electronic device according to various embodiments of the disclosure may perform a function corresponding to the event and provide screen data to share the same with the external electronic device at the same time.

Solution to Problem

In accordance with an aspect of the disclosure, an electronic device is provided. The electronic device includes: a communication circuit; a touch screen display; an audio processing circuit; a memory; and a processor electrically connected to the communication circuit, the touch screen display, the audio processing circuit, and the memory, wherein the processor is configured to display a first screen and a second screen on the touch screen display, recognize an external electronic device connected through the communication circuit when an input for performing a screen sharing function is detected through the touch screen display, and transmit at least one screen among the first screen and the second screen and at least one audio signal among audio signals corresponding to the first screen and the second screen to the recognized external electronic device.

In accordance with another aspect of the disclosure, a method of sharing a screen by an electronic device is provided. The method includes: displaying a first screen and a second screen on a touch screen display; when an input for performing a screen sharing function is detected through the touch screen display, recognizing an external electronic device connected through a communication circuit; and transmitting at least one screen among the first screen and the second screen and at least one audio signal among audio signals corresponding to the first screen and the second screen to the recognized external electronic device.

Advantageous Effects of Invention

According to various embodiments of the disclosure, an electronic device can provide a screen and an audio signal selected by a user to share the same with an external electronic device through a screen sharing technology. Among screens and audio signals output from the electronic device, only a screen and an audio signal can be shared with the external electronic device, so that satisfaction of the user can be increased.

According to various embodiments of the disclosure, if an event is received while screen data is shared with the external electronic device, the electronic device can also perform a function corresponding to the received event without hindrance to the screen sharing operation being performed.

BRIEF DESCRIPTION OF DRAWINGS

FIGS. 4A and 4B illustrate a screen sharing method when the number of recognized external electronic devices is one according to various embodiments of the disclosure;

FIGS. 5A and 5B illustrate a screen sharing method when the number of recognized external electronic devices is plural according to various embodiments of the disclosure;

MODE FOR CARRYING OUT THE INVENTION

Figure 1:
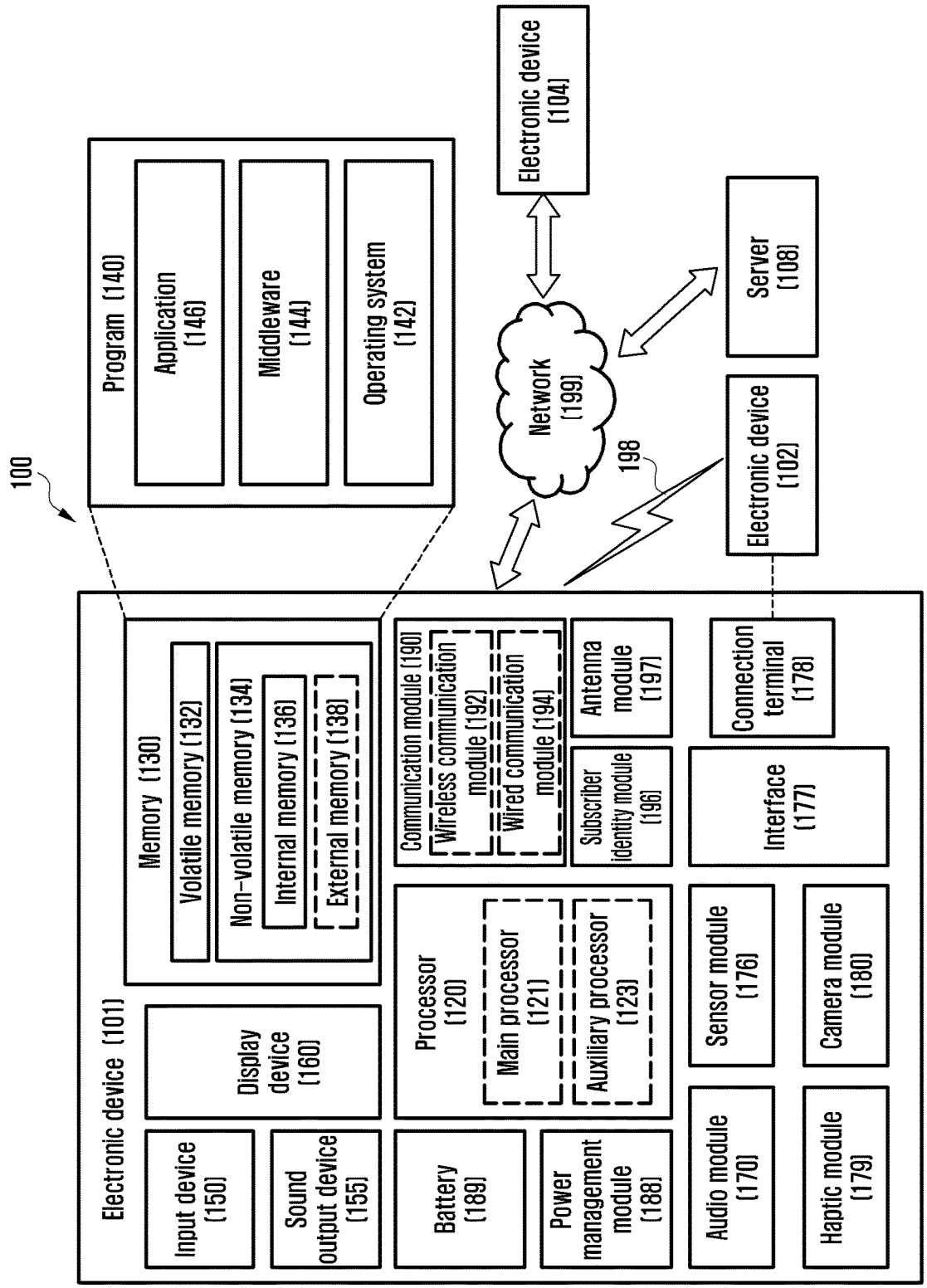
FIG. 1 is a block diagram of an electronic device in a network environment according to various embodiments.

FIG. 1 is a block diagram of an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. The auxiliary processor 123 may be implemented as separate from, or as embedded in the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102) (e.g., speaker or headphone) directly via a wire or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly via a wire or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may include one or more antennas for transmitting or receiving a signal or power to or from the outside. According to an embodiment, the communication module 190 (e.g., the wireless communication module 192) may transmit a signal to or receive a signal from an external electronic device through an antenna suitable for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
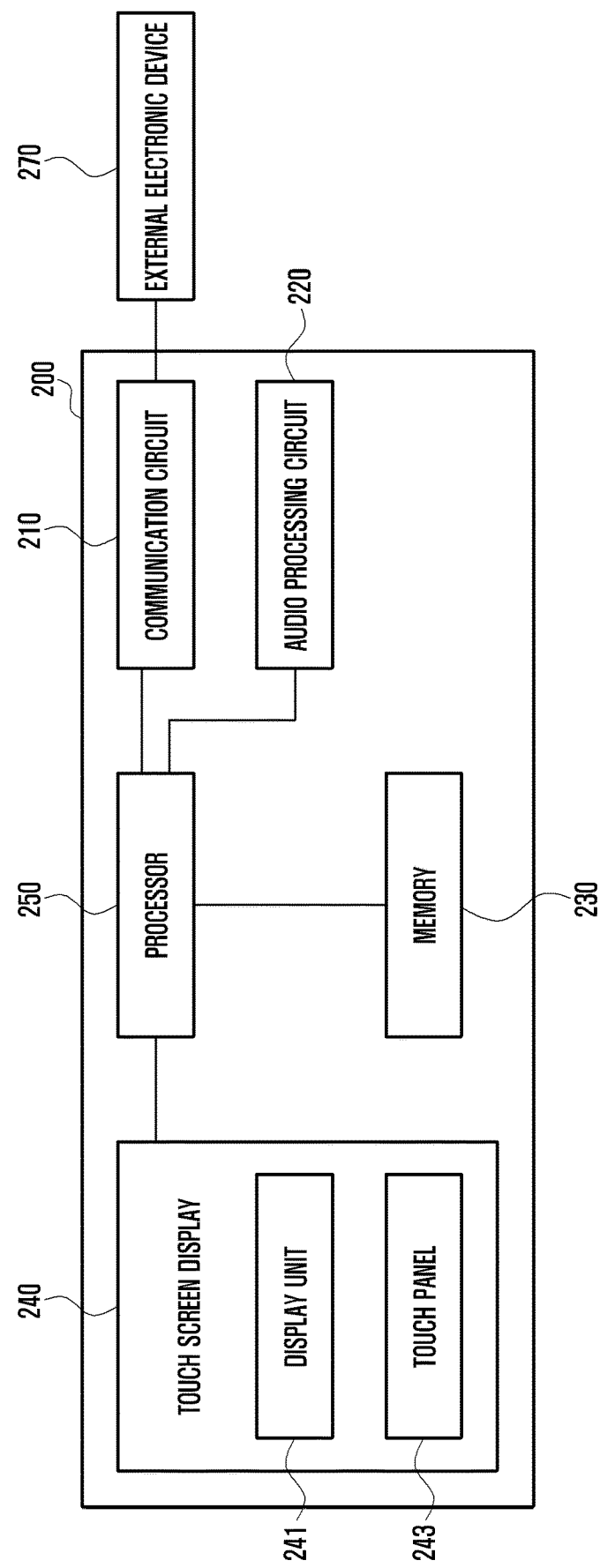
FIG. 2 is a block diagram of an electronic device according to various embodiments of the disclosure.

FIG. 2 is a block diagram illustrating an electronic device according to various embodiments of the disclosure.

Referring to FIG. 2, an electronic device 200 (for example, the electronic device 101 of FIG. 1) may include a communication circuit 210 (for example, the communication module 190 of FIG. 1), an audio processing circuit 220, a memory 230 (for example, the memory 130 of FIG. 1), a touch screen display 240 (for example, the display 160 of FIG. 1), and a processor 250 (for example, the processor 120 of FIG. 1).

According to various embodiment of the disclosure, the communication circuit 210 (for example, the communication module 190 of FIG. 1) may establish communication with an external electronic device 270. For example, the communication circuit 210 may be connected to a network through wireless communication or wired communication and may communicate with the external electronic device 270. The communication circuit 210 may be wiredly or wirelessly connected to the external electronic device 270 through an interface (for example, the interface 177 of FIG. 1) and may transmit and receive data.

According to an embodiment, an input for sharing a screen with the connected external electronic device 270 is detected under the control of the processor 250, the communication circuit 210 may transmit data (for example, at least one screen and at least one audio signal) for sharing the screen to the external electronic device 270.

According to various embodiments of the disclosure, the audio processing circuit 220 may include a speaker and a microphone. The audio processing circuit 220 may process, amplify, and output an audio signal. The audio processing circuit 220 may output an audio signal through a speaker of the electronic device 200 or earphones (or an external speaker) wiredly/wirelessly connected to the electronic device 200.

According to various embodiments of the disclosure, the memory 230 (for example, the memory 130 of FIG. 1) may be electrically connected to the processor 250.

According to an embodiment, when at least one screen displayed on the touch screen display 240 is shared with the external electronic device 270, the memory 230 may store a program for determining at least one audio signal to be transmitted to the external electronic device 270 on the basis of a type of an application corresponding to at least one screen.

According to various embodiments of the disclosure, the touch screen display 240 (for example, the display device 160 of FIG. 1) may be configured in an integral type including a display unit 241 and a touch panel 243. The display unit 241 may display various screens according to the use of the electronic device 200. Further, the display unit 241 may include a liquid crystal display (LCD), a light emitting diode (LED) display, an organic light emitting diode (OLED) display, a microelectromechanical system (MEMS) display, or an electronic paper display. The display unit 241 may display, for example, various pieces of content (for example, text, images, videos, icons, or symbols) to the user. The touch panel 243 may receive, for example, a touch, gesture, proximity, or hovering input using an electronic pen or a user's body part may be received.

According to an embodiment, the touch screen display 240 may display two or more application execution screens according to execution of two or more applications in a multi-window form.

According to an embodiment, the touch screen display 240 may display two or more application execution screens according to execution of two or more applications in a popup window form.

According to an embodiment, if an input for performing a screen sharing function is detected under the control of the processor 250, the touch screen display 240 may display a popup window for determining at least one screen to be shared with the external electronic device 270 among the two or more screens. The touch screen display 240 may display a popup window for determining at least one audio signal to be shared with the external electronic device 270 among audio signals corresponding to the two or more screens.

According to an embodiment, if at least one screen and at least one audio signal determined under the control of the processor 250 are transmitted to the external electronic device 270, the touch screen display 240 may display a menu for controlling at least one screen transmitted to the external electronic device 270 in an area in which at least one screen of the touch screen display 240 is displayed.

According to various embodiments of the disclosure, the processor 250 (for example, the processor 120 of FIG. 1) may control the overall operation of the electronic device 200 and signal flow between internal elements of the electronic device 200, perform data processing, and control power supply to the elements from a battery (for example, the battery 189 of FIG. 1).

According to an embodiment, the processor 250 may display two or more screens (for example, two or more application execution screens according to execution of two or more applications) on the touch screen display 240 in a multi-window form (or a popup window form). If an input for performing the screen sharing function is detected, the processor 250 may recognize the external electronic device 270 connected through the communication circuit 210. The processor 250 may determine at least one screen and at least one audio signal among audio signals corresponding to two or more screens to be shared with the recognized external electronic device 270. The processor 250 may transmit at least one determined screen and at least one determined audio signal to the external electronic device 270.

The processor 250 may display a menu for controlling at least one screen transmitted to the external electronic device 270 in an area in which at least one screen of the touch screen display 240 is displayed.

According to an embodiment, if an input for switching two or more screens displayed on the touch screen display 240 is detected, the processor 250 may stop transmitting at least one screen and at least one audio signal, which are being transmitted, and transmit at least one other screen and at least one other audio signal to the external electronic device 270.

According to an embodiment, if a predetermined event (for example, a message, a call, or a system notification) is received while the screen sharing function is performed with the external electronic device 270 connected through the communication circuit 210, the processor 250 may transmit a notification of the received predetermined event to the external electronic device 270. When a function corresponding to the received predetermined event is performed, the processor 250 may control and transmit at least one of the screen, which is being shared, and the audio signal on the basis of a type of the received predetermined event.

According to various embodiments of the disclosure, the external electronic device 270 may be a device, which is the same type as the electronic device 200, or a device including a display, which is a different type as the electronic device.

According to an embodiment, the electronic device 200 may be a device including a small display, and the external electronic device 270 may be a device including a large display. Further, the external electronic device 270 may be a display device including a sound source output device or a monitor having earphones and a speaker, or a TV.

According to an embodiment, the external electronic device 270 may have a wireless communication function such as Wi-Fi, Bluetooth, near field communication (NFC), or a global navigation satellite system (GNSS). Further, the external electronic device 270 may have a wired communication function such as a universal serial bus (USB), a high definition multimedia interface (HDMI), recommended standard 232 (RS-232), power line communication, or plain old telephone service (POTS).

According to an embodiment, the external electronic device 270 may receive shared-screen data from the electronic device 200 through wired or wireless communication and display the same. Further, the external electronic device 270 may receive an audio signal from the electronic device 200 through wired or wireless communication and output the same.

Figure 3:
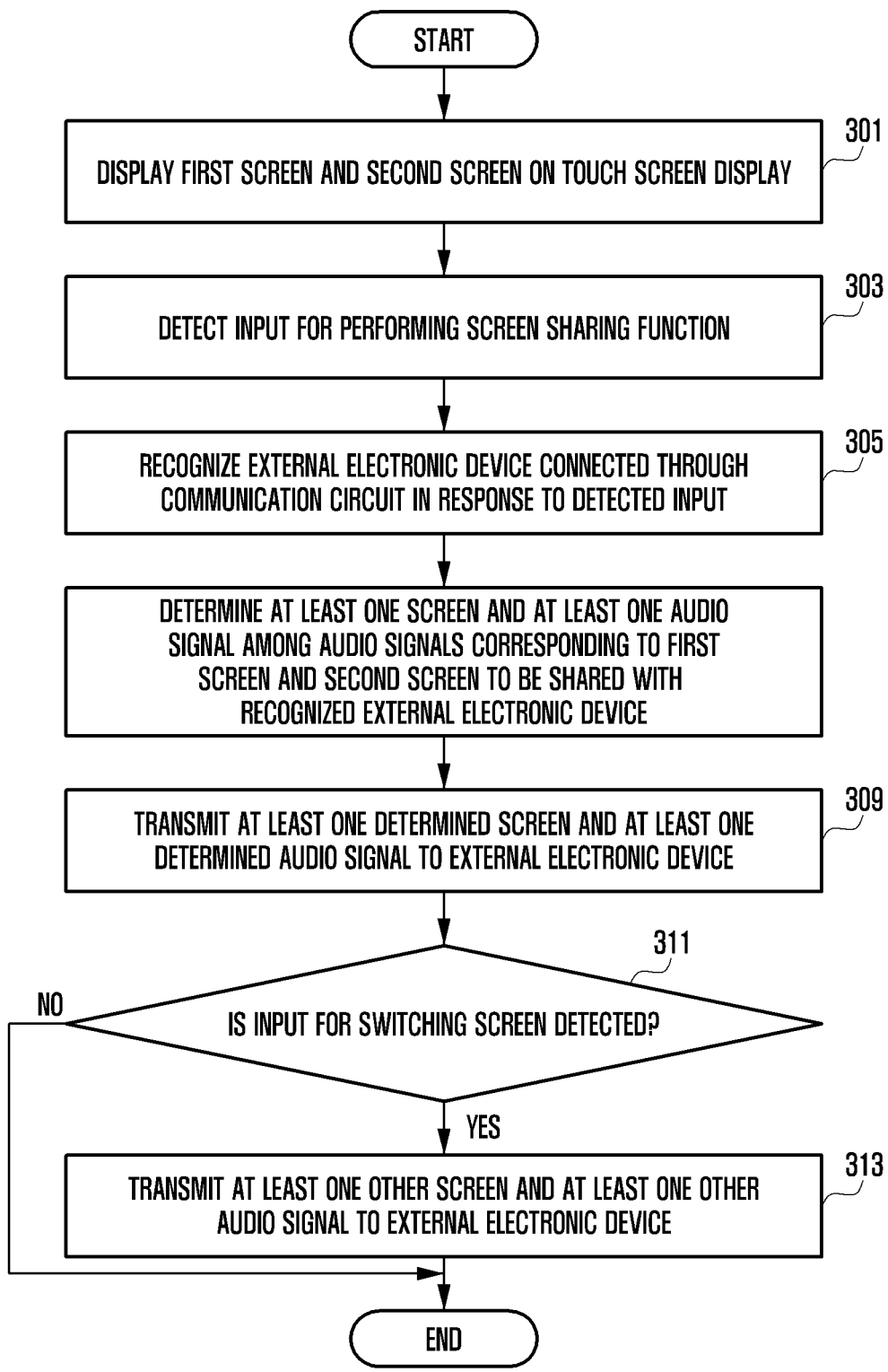
FIG. 3 is a flowchart illustrating a screen sharing method according to various embodiments of the disclosure.

FIG. 3 is a flowchart illustrating a screen sharing method according to various embodiments of the disclosure.

Referring to FIG. 3, at operation 301, a processor (for example, the processor 250 of FIG. 2) may display two or more screens, for example, a first screen and a second screen on a touch screen display (for example, the touch screen display 240 of FIG. 2).

According to an embodiment, each of the first screen and the second screen may be a screen according to execution of an application. For example, the screen according to execution of the application may include a game screen, a music or video reproduction screen, a call screen, an image screen, and a webpage screen.

According to an embodiment, the first screen and the second screen may be displayed in a first area and a second area, split from the entire area of the touch screen display, in a multi-window form, or the second screen may be displayed in a part of the area in which the first screen is displayed in a picture in picture (PIP) form.

According to an embodiment, each of the first screen and the second screen may be displayed on the touch screen display in a popup window form.

According to an embodiment, at operation 303, the processor may detect an input for performing the screen sharing function.

According to an embodiment, the input for performing the screen sharing function may be a preset gesture detected on the touch screen display on which the first screen and the second screen are displayed. For example, the preset gesture may include a long press made on the touch screen display in which the first screen and the second screen are displayed, and an input for selecting an icon of the screen sharing function.

According to an embodiment, at operation 305, the processor may recognize an external electronic device (for example, the external electronic device 270 of FIG. 2) connected through a communication circuit (for example, the communication circuit 210 of FIG. 2) in response to the input for performing the screen sharing function.

According to an embodiment, the processor may display a list of the connected external electronic devices in response to the input for performing the screen sharing function.

According to an embodiment, the connected external electronic devices may be one or more.

According to an embodiment, if selection of an external electronic device to share the screen from the displayed external electronic device list is detected, the processor may perform the following operation. However, the disclosure is not limited thereto, and if the number of external electronic devices connected through the communication circuit is one, the processor may omit an operation of displaying the external electronic device list and perform the following operation.

A detailed description of the case in which the number of connected external electronic devices is one will be made with reference to FIGS. 4A to 4D below. Further, a detailed description of the case in which the number of connected external electronic devices is two or more will be made with reference to FIGS. 5A and 4B below.

According to an embodiment, at operation 307, the processor may determine at least one screen and at least one audio signal among audio signals (for example, a first audio signal and a second audio signal) corresponding to the first screen and the second screen to be shared with the external electronic device.

For example, the processor may display a popup window for determining whether to share the first screen and the second screen displayed on the touch screen display with the external electronic device or whether to share one of the first screen and the second screen with the external electronic device.

According to an embodiment, after determining at least one screen to be shared with the external electronic device, the processor may further display a popup window for determining at least one audio signal to be shared with the external electronic device among the first audio signal corresponding to the first screen and the second audio signal corresponding to the second signal.

According to an embodiment, the audio signal to be transmitted to (for example, shared with) the external electronic device may be preset according to a type of an application corresponding to the screen.

For example, it is assumed that a video reproduction screen is displayed as the first screen according to execution of a video reproduction application, and a music reproduction screen is displayed as the second screen according to execution of a music reproduction application. If the video reproduction screen is shared with the external electronic device among the video reproduction screen and the music reproduction screen, the processor may be configured to transmit the video reproduction screen and an audio signal corresponding thereto to the external electronic device.

Further, it is assumed that an image reproduction screen is displayed as the first screen according to execution of a photo application, and a music reproduction screen is displayed as the second screen according to execution of a music application. If the image reproduction screen is shared with the external electronic device among the image reproduction screen and the music reproduction screen, the processor may be configured to transmit the image reproduction screen and an audio signal corresponding to the music reproduction screen to the external electronic device because the image reproduction screen has no audio signal.

According to an embodiment, at operation 309, the processor may transmit at least one determined screen and at least one determined audio signal to the external electronic device through the communication circuit.

For example, if it is assumed that a screen and an audio signal to be shared with the external electronic device are a first screen and a second audio signal, the processor may separate a first audio signal from the first screen and transmit the first screen from which the first audio signal is separated to the external electronic device through the communication circuit. Further, the processor may separate the second audio signal from a second screen and change an output path of the second audio signal. For example, the processor may change the output path of the second audio signal from an audio processing circuit (for example, the audio processing circuit 220 of FIG. 2) of the electronic device (for example, the electronic device 200 of FIG. 2) to the external electronic device. The processor may transmit the second audio signal except for the second screen to the external electronic device through the communication circuit so as to output the second audio signal through the external electronic device.

According to an embodiment, if the first screen and the second audio signal are transmitted to the external electronic device through the communication circuit, the processor may display the first screen and the second screen on the touch screen display. Further, the processor may control to output the first audio signal separated from the first screen through the speaker of the electronic device or earphones (or an external speaker) wiredly/wirelessly connected to the electronic device.

According to an embodiment, if the external electronic device does not include a speaker for outputting an audio signal, the processor may recognize that the external electronic device does not include the speaker, transmit only the first screen to the external electronic device through the communication circuit, and control to output the second audio signal through the speaker of the electronic device or earphones (or an external speaker) wiredly/wirelessly connected to the electronic device.

According to an embodiment, at operation 311, the processor may determine whether an input for switching a screen on the touch screen display is detected. If the input for switching the screen is detected, at operation 313, the processor may transmit at least one other screen among the first screen and the second screen and at least one other audio signal among the first audio signal and the second audio signal to the external electronic device.

According to an embodiment, if the input for switching the screen is detected, the processor may stop transmitting at least one screen (for example, the first screen) and at least one audio signal (for example, the second audio signal), which are being shared, to the external electronic device and transmit at least one other screen (for example, the second screen) and at least one other audio signal (for example, the first audio signal) to the external electronic device. For example, the processor may transmit the second screen separated from the second audio signal to the external electronic device through the communication circuit in response to the input for switching the screen. Further, the processor may change an output path of the first audio signal and the second audio signal in response to the input for switching the screen. The processor may change the output path of the first audio signal from the audio processing circuit of the electronic device to the external electronic device and change the output path of the second audio signal from the external electronic device to the audio processing circuit of the electronic device. The processor may transmit the first audio signal to the external electronic device through the communication circuit so that the first audio signal is output through the external electronic device.

According to an embodiment, the input for switching the screen may include "swipe" from an area of the first screen (or an area of the second screen) displayed on the touch screen display to an area of the second screen (or an area of the first screen).

Figure 4B:
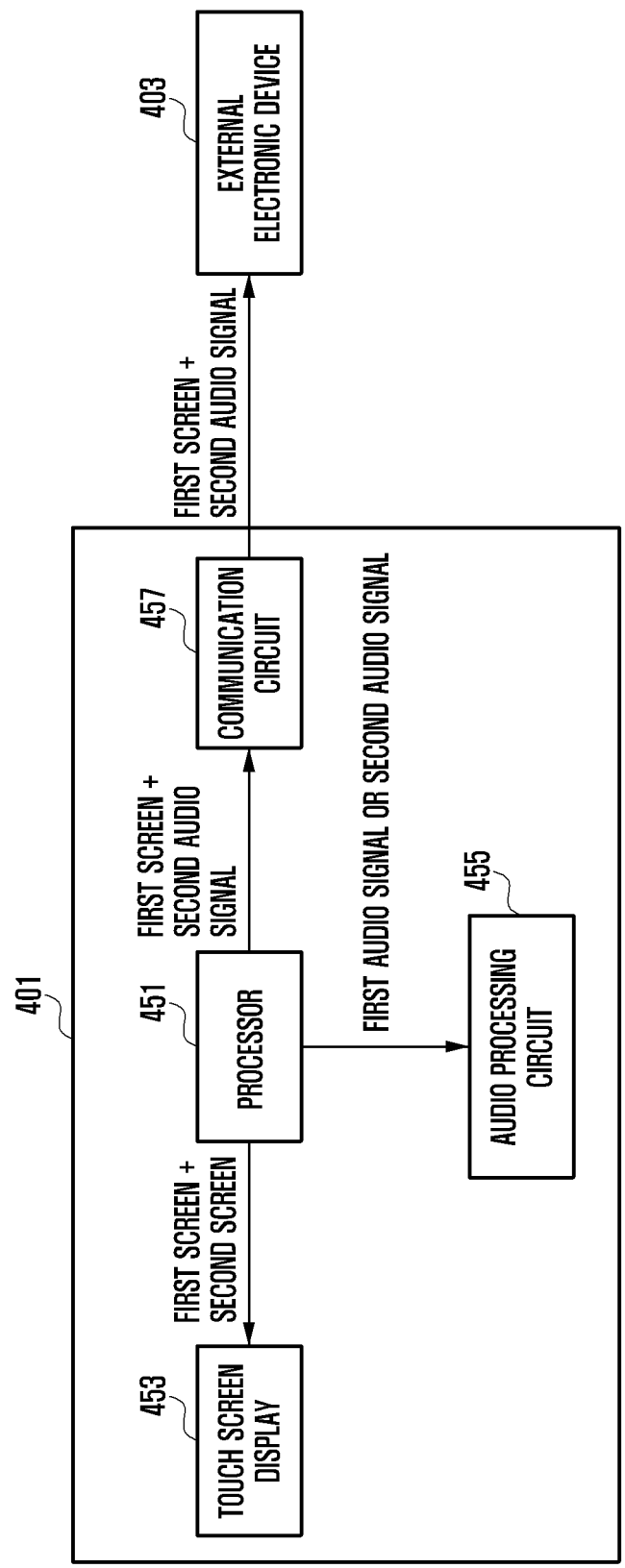

FIGS. 4A and 4B illustrate a screen sharing method when the number of recognized external electronic devices is one according to various embodiments of the disclosure.

Figure 4C:
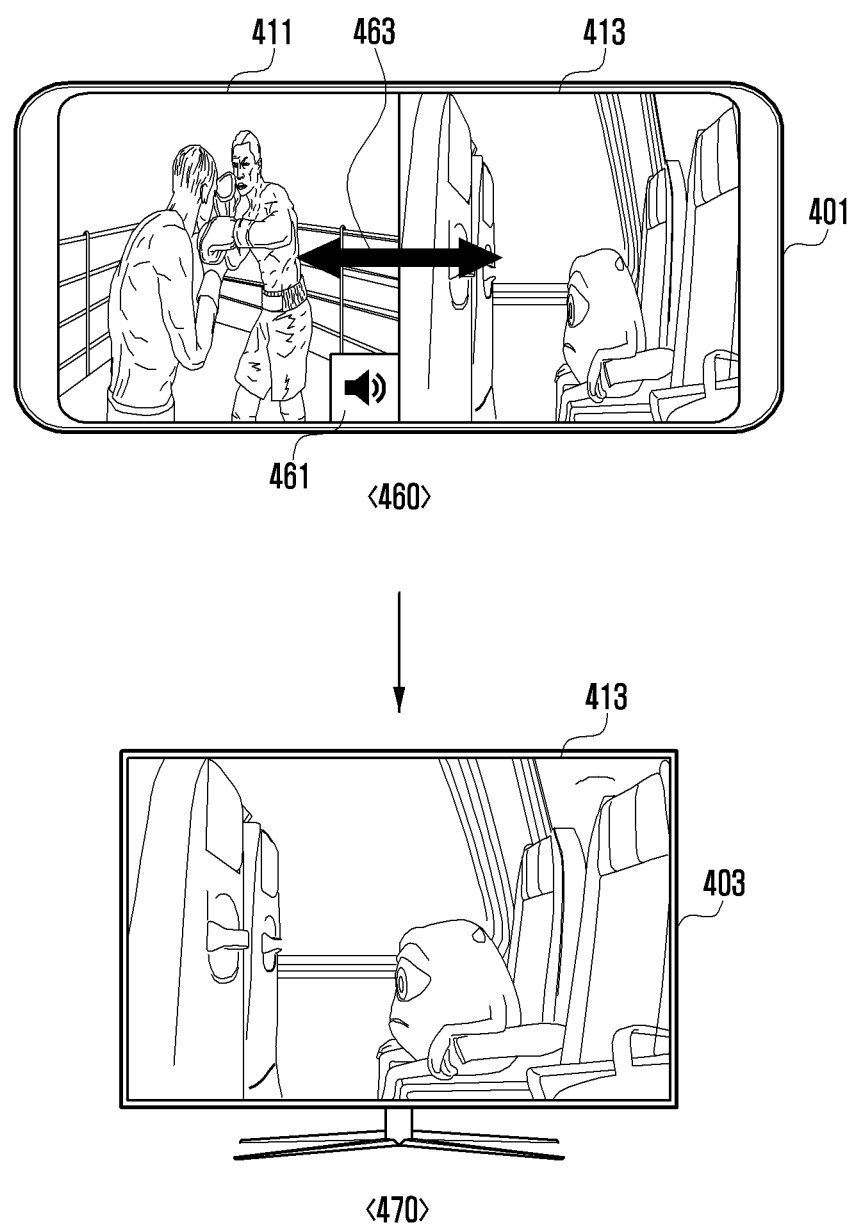
FIGS. 4C and 4D illustrate a screen sharing method when an input for switching a screen is detected according to various embodiments of the disclosure.
Figure 4D:
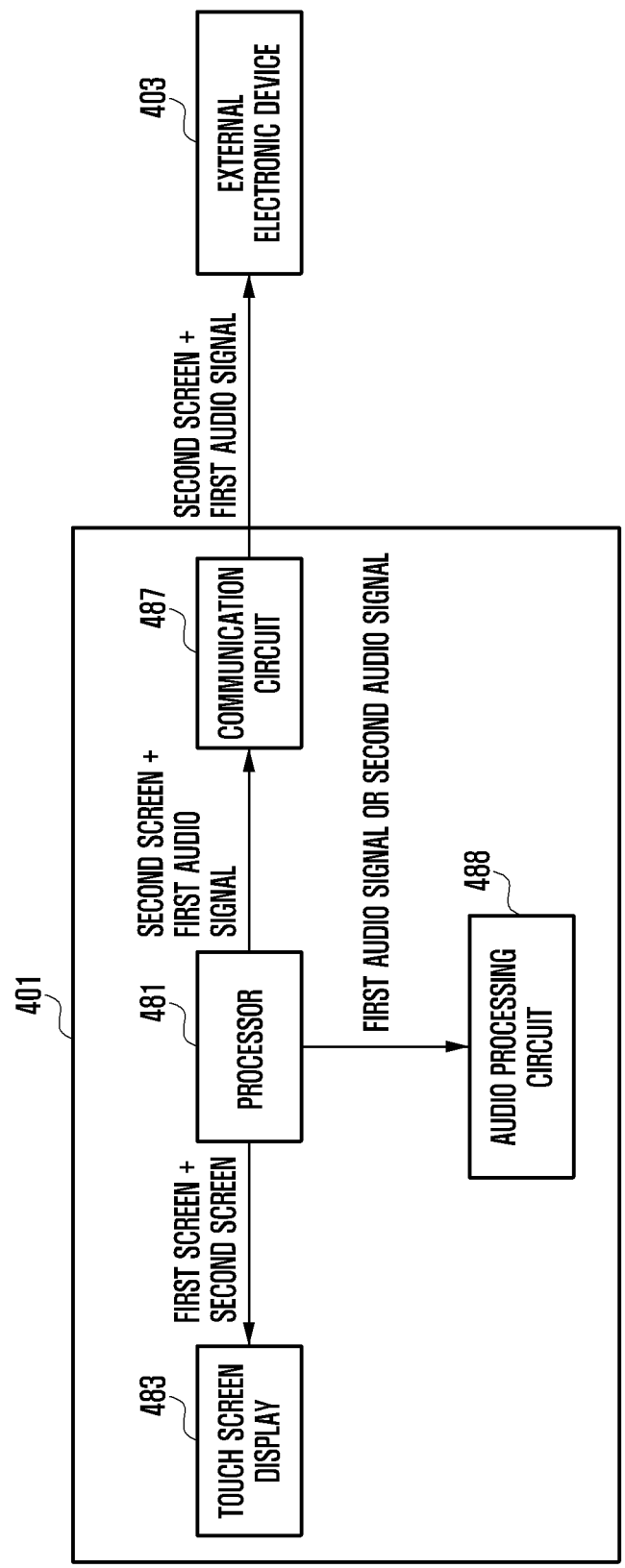

FIGS. 4C and 4D illustrate a screen sharing method when an input for switching a screen is detected according to various embodiments of the disclosure.

FIGS. 4A to 4D described below illustrate the case in which one external electronic device 403 (for example, the external electronic device 270 of FIG. 2) is connected to an electronic device 401 (for example, the electronic device 200 of FIG. 2).

Referring to FIGS. 4A and 4B, a processor 451 (for example, the processor 250 of FIG. 2) of the electronic device 401 may display a first screen 411 and a second screen 413 on a touch screen display 453 (for example, the touch screen display 240 of FIG. 2) in a multi-window form as indicated by reference numeral 410. However, the disclosure is not limited thereto, and the first screen 411 and the second screen 413 may be displayed on the touch screen display 453 in a popup window form.

Hereinafter, it is assumed that the first screen 411 and the second screen 413 are video reproduction screens.

According to an embodiment, the processor 451 may detect an input (for example, a long press detected on the touch screen display 453 or an input for selecting an icon for a screen sharing function) for sharing at least one of the first screen 411 and the second screen 413 with the external electronic device 403.

According to an embodiment, the processor 451 may display a popup window 421 for determining at least one screen to be shared with the external electronic device 403 among the first screen 411 and the second screen 413 in response to the input for sharing the screen as indicated by reference numeral 420. For example, the popup window 421 may include a menu for sharing the first screen 411 and the second screen 413 with the external electronic device 403, a menu for sharing the first screen 411, and a menu for sharing the second screen 413.

According to an embodiment, after determining at least one screen to be shared, the processor 451 may further display a popup window 431 for determining at least one audio signal to be shared with the external electronic device 403 among a first audio signal corresponding to the first screen 411 and a second audio signal corresponding to the second screen 513 as indicated by reference numeral 430.

For example, similar to the popup window 421 for determining at least one screen to be shared, the popup window 431 for determining at least one audio signal to be shared with the external electronic device 403 may include a menu for sharing the first audio signal and the second audio signal, a menu for sharing the first audio signal, and a menu for sharing the second audio signal.

However, the disclosure is not limited thereto, and, for example, the processor 451 may display a popup window including a menu for simultaneously determining at least one screen and at least one audio signal (for example, a menu for sharing the first screen 411, the second screen 413, the first audio signal, and the second audio signal, a menu for sharing the first screen 411 and the first audio signal, a menu for sharing the first screen 411 and the second audio signal, a menu for sharing the second screen 413 and the first audio signal, and a menu for sharing the second screen 413 and the second audio signal).

According to an embodiment, the processor 451 may transmit at least one screen and at least one audio signal determined through the popup windows 421 and 431 to the external electronic device 403 through a communication circuit 457 (for example, the communication 210 of FIG. 2).

For example, if an input for selecting the menu for sharing the first screen 411 and the second audio signal is detected through the popup windows 421 and 431, the processor 451 may transmit the first screen 411 and the second audio signal to the external electronic device 403 through the communication circuit 457.

According to an embodiment, if the first screen 411 is selected through the popup window 421 for determining at least one screen to be shared, the processor 451 may separate the first audio signal from the first screen 411. The processor 451 may transmit the first screen 411 except for the first audio signal to the external electronic device 403 through the communication circuit 457 so that the first screen 411 outputs to the external electronic device 403.

According to an embodiment, if the second audio signal is selected through the popup window 431 for determining at least one audio signal to be shared, the processor 451 may separate the second audio signal from the second screen 413 and change an output path of the second audio signal. For example, the processor 451 may change the output path of the second audio signal from an audio processing circuit 455 (for example, the audio processing circuit 220 of FIG. 2) of the electronic device 401 to the external electronic device 403. The processor 451 may transmit the second audio signal except for the second screen 413 to the external electronic device 403 through the communication circuit 457 so that the second audio signal is output through the external electronic device 403.

According to an embodiment, the external electronic device 403 may display the first screen 411 received from the electronic device 401 through the communication circuit 457 on the display and output the second audio signal as indicated by reference numeral 440.

According to an embodiment, the processor 451 may transmit the first screen 411 and the second audio signal to the external electronic device 403 through the communication circuit 457 and output the first screen 411 and the second screen 413 through the touch screen display 453.

According to an embodiment, the processor 451 may output the first audio signal or the second audio signal through the audio processing circuit 455. For example, if the second audio signal is transmitted to the external electronic device 403 through the communication circuit 457, the processor 451 may transmit the first audio signal to the audio processing circuit 455.

Referring to FIGS. 4C and 4D, if the first screen 411 and the second audio signal are shared with the external electronic device 403, a processor 481 (for example, the processor 250 of FIG. 2) of the electronic device 401 may display an icon (for example, a screen brightness icon or a volume control icon 461) for controlling at least one of the first screen and the second audio signal displayed on the display of the external electronic device 403 in an area (for example, at least a portion of the area in which the first screen 411 is displayed) in which the first screen 411 of the touch screen display 483 (for example, the touch screen display 240 of FIG. 2) is displayed as indicated by reference numeral 460. For example, the processor 481 may control a brightness of the first screen 411 output to the external electronic device 403 through the screen brightness icon or control a volume of the second audio signal output to the external electronic device 403 through the volume control icon 461.

According to an embodiment, the processor 481 may detect an input 463 for switching the screen while the first screen 411 and the second screen 413 are displayed on the touch screen display 483 in a multi-window form as indicated by reference number 460. For example, the input 463 for switching the screen may be a swipe input from an area in which the first screen 411 (or the second screen 413) is displayed to an area in which the second screen 413 (or the first screen 411) is displayed.

According to an embodiment, the processor 481 may stop transmitting the first screen 411 to the external electronic device 403 and transmit the second screen 413 to the external electronic device 403 in response to the input 463 for switching the screen as indicated by reference numeral 481 as indicated by reference numeral 470. For example, the processor 481 may transmit the second screen 413 to the external electronic device 403 through the communication circuit 487 (for example, the communication circuit 210 of FIG. 2) in response to the input for switching the screen so that the second screen 413 is output to the external electronic device 403.

According to an embodiment, the processor 481 may transmit the second screen 413 to the external electronic device 403, stop transmitting the second audio signal to the external electronic device 403, and transmit the first audio signal to the external electronic device 403 in response to the input 463 for switching the screen. For example, the processor 481 may change an output path of the first audio signal and the second audio signal in response to the input for switching the screen. For example, the processor 481 may change the output path of the first signal from an audio processing circuit 485 (for example, the audio processing circuit 220 of FIG. 2) of the electronic device 401 to the external electronic device 403 and change the output path of the second audio signal from the external electronic device 403 to the audio processing circuit 485 of the electronic device 401. The processor 481 may transmit the first audio signal to the external electronic device 403 through the communication circuit 487 so that the first audio signal is output through the external electronic device 403.

In other words, the electronic device 401 may switch and transmit not only the screen transmitted to the external electronic device 403 but also the audio signal according thereto in response to the input 463 for switching the screen.

According to an embodiment, the processor 481 may transmit the second screen 413 and the first audio signal to the external electronic device 403 through the communication circuit 487 and output the first screen 411 and the second screen 413 through the touch screen display 483.

According to an embodiment, the processor 481 may output the first audio signal or the second audio signal through the audio processing circuit 485. For example, if the first audio signal is transmitted to the external electronic device 403 through the communication circuit 487, the processor 481 may transmit the second audio signal to the audio processing circuit 485.

Figure 5B:
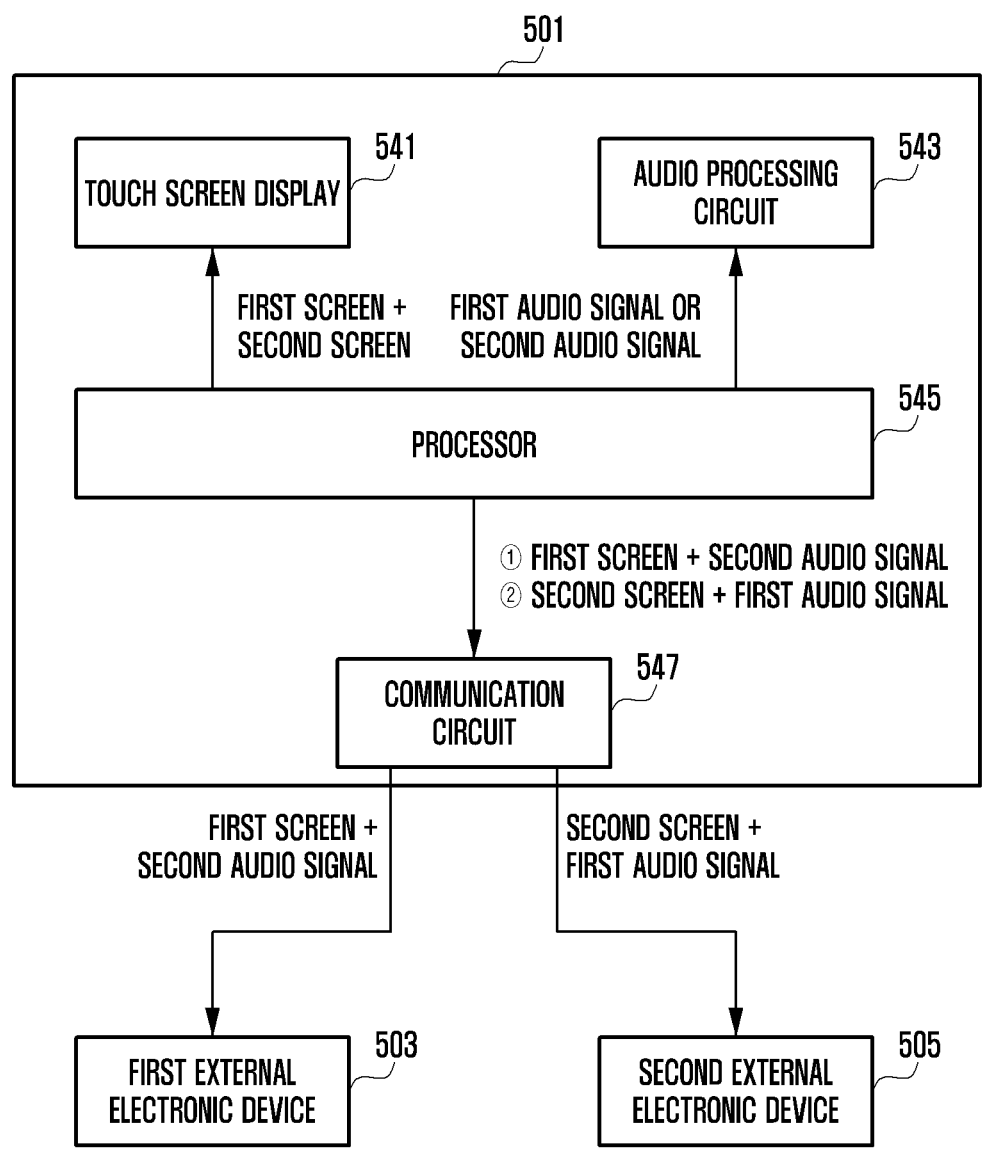

FIGS. 5A and 5B illustrate a screen sharing method when the number of recognized external electronic devices is plural according to various embodiments of the disclosure.

FIGS. 5A and 5B described below illustrate the case in which two or more external electronic devices 503 and 505 (for example, the external electronic device 270 of FIG. 2) are connected to an electronic device 501 (for example, the electronic device 200 of FIG. 2).

Referring to FIGS. 5A and 5B, a processor 545 (for example, the processor 250 of FIG. 2) of the electronic device 501 may display a first screen 511 and a second screen 513 on a touch screen display 541 (for example, the touch screen display 240 of FIG. 2) in a multi-window form as indicated by reference numeral 510.

According to an embodiment, the processor 545 may detect an input for sharing at least one of the first screen 511 and the second screen 513 with a first external electronic device 503 and a second external electronic device 505.

According to an embodiment, the processor 545 may determine at least one screen among the first screen 511 and the second screen 513 and at least one audio signal among a first audio signal corresponding to the first screen 511 and a second audio signal corresponding to the second screen 513, to be shared with the first external electronic device 503 and the second external electronic device 505, in response to the input for sharing the screen. The processor 545 may transmit at least one determined screen and at least one determined audio signal to the external electronic device through the corresponding communication circuit 547. For example, at least one screen and at least one audio signal to be shared with each of the first external electronic device 503 and the second external electronic device 505 may be determined by a method similar to the determination method through the popup windows 421 and 431 as indicated by reference numerals 420 and 430 of FIG. 4A described above.

According to an embodiment, it is assumed that the first screen 511 and the second audio signal are shared with the first external electronic device 503, and the second screen 513 and the first audio signal are shared with the second external electronic device 505.

According to an embodiment, the processor 545 may separate the first audio signal from the first screen 511. The processor 545 may transmit the first screen 511 except for the first audio signal to the first external electronic device 503 through a communication circuit 547 (for example, the communication circuit 210 of FIG. 2) so that the first screen 511 is output to the first external electronic device 503. Further, the processor 545 may separate the second audio signal from the second screen 513 and change an output path of the second audio signal. For example, the processor 545 may change the output path of the second audio signal from an audio processing circuit 543 (for example, the audio processing circuit 220 of FIG. 2) of the electronic device 501 to the first external electronic device 503. The processor 545 may transmit the second audio signal except for the second screen 513 to the first external electronic device 503 through the communication circuit 547 so that the second audio signal is output through the first external electronic device 503.

According to an embodiment, the first external electronic device 503 may display the first screen 511 received from the electronic device 501 through the communication circuit 547 on the display and output the second audio signal as indicated by reference numeral 520.

According to an embodiment, the processor 545 may transmit the first audio signal separated from the first screen 511 and the second screen 513 separated from the second audio signal to the second external electronic device 505 through the communication circuit 547.

According to an embodiment, the second external electronic device 505 may display the second screen 513 received from the electronic device 501 through the communication circuit 547 on the display and output the first audio signal as indicated by reference numeral 530.

According to an embodiment, the processor 545 may transmit the first screen 511 and the second audio signal to the first external electronic device 503, transmit the second screen 513 and the first audio signal to the second external electronic device 505, and output the first screen 511 and the second screen 513 through the touch screen display 541.

According to an embodiment, the processor 545 may output the first audio signal or the second audio signal through the audio processing circuit 543.

According to an embodiment, if an input for switching the first screen 511 and the second screen 513 is detected (not shown), the processor 545 may stop transmitting the first screen 511 and the second audio signal to the first external electronic device 503 and transmit the second screen 513 and the first audio signal. Further, the processor 545 may stop transmitting the second screen 513 and the first audio signal to the second external electronic device 505 and transmit the first screen 511 and the second audio signal.

Figure 6:
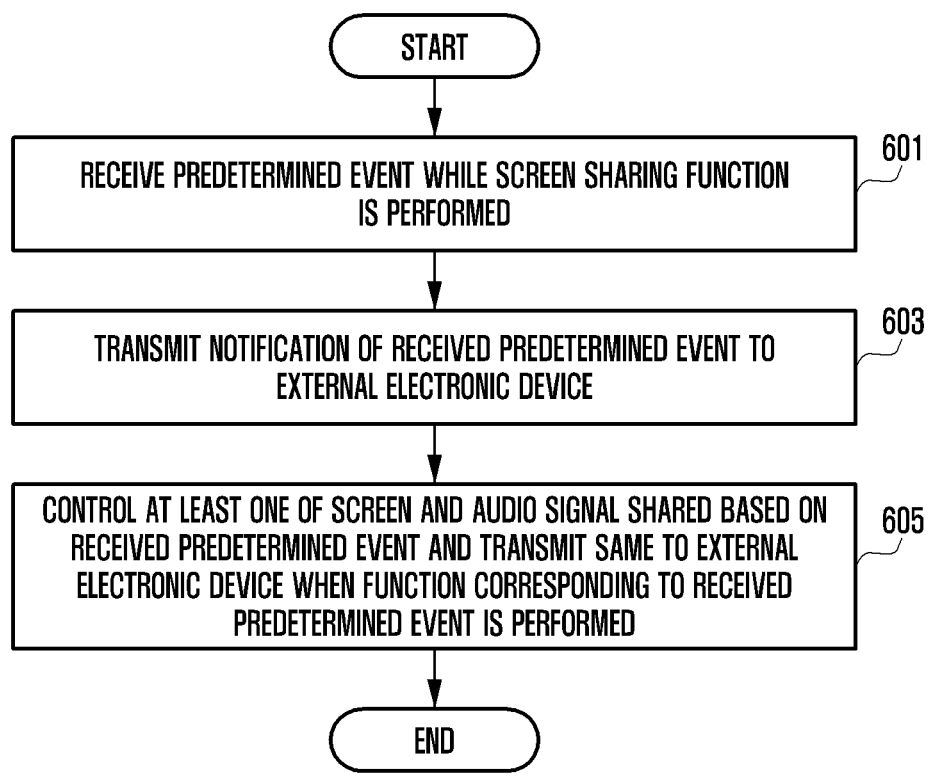
FIG. 6 is a flowchart illustrating a screen sharing method when a predetermined event is received while a screen sharing function is performed according to various embodiments of the disclosure.

FIG. 6 is a flowchart illustrating a screen sharing method when a predetermined event is received while a screen sharing function is performed according to various embodiments of the disclosure.

Referring to FIG. 6, at operation 601, a processor (for example, the processor 250 of FIG. 2) may receive a predetermined event while a screen sharing function is performed with a connected external electronic device (for example, the external electronic device 270 of FIG. 2). For example, the predetermined event may include a message event, a call event, and a system notification event.

According to an embodiment, if the predetermined event is received, at operation 603, the processor may transmit a notification of the received predetermined event to the external electronic device.

As the external electronic device receives the notification of the predetermined event from an electronic device (for example, the electronic device 200 of FIG. 2), the external electronic device may output the notification of the predetermined event along with at least one screen and at least one audio signal which are being shared.

For example, the notification of the predetermined event may be output on a display of the external electronic device in the form of a message (for example, a toast message or a popup message) and/or output in the form of an audio signal (for example, an event notification sound).

According to an embodiment, when a function corresponding to the received predetermined event is performed, at operation 605, the processor may control at least one of at least one screen and at least one audio signal on the basis of the received predetermined event and transmit the same to the external electronic device. For example, if a type of the received predetermined event includes an audio signal, the processor may control a volume of the audio signal transmitted to the external electronic device (for example, turn down the volume).

Figure 7:
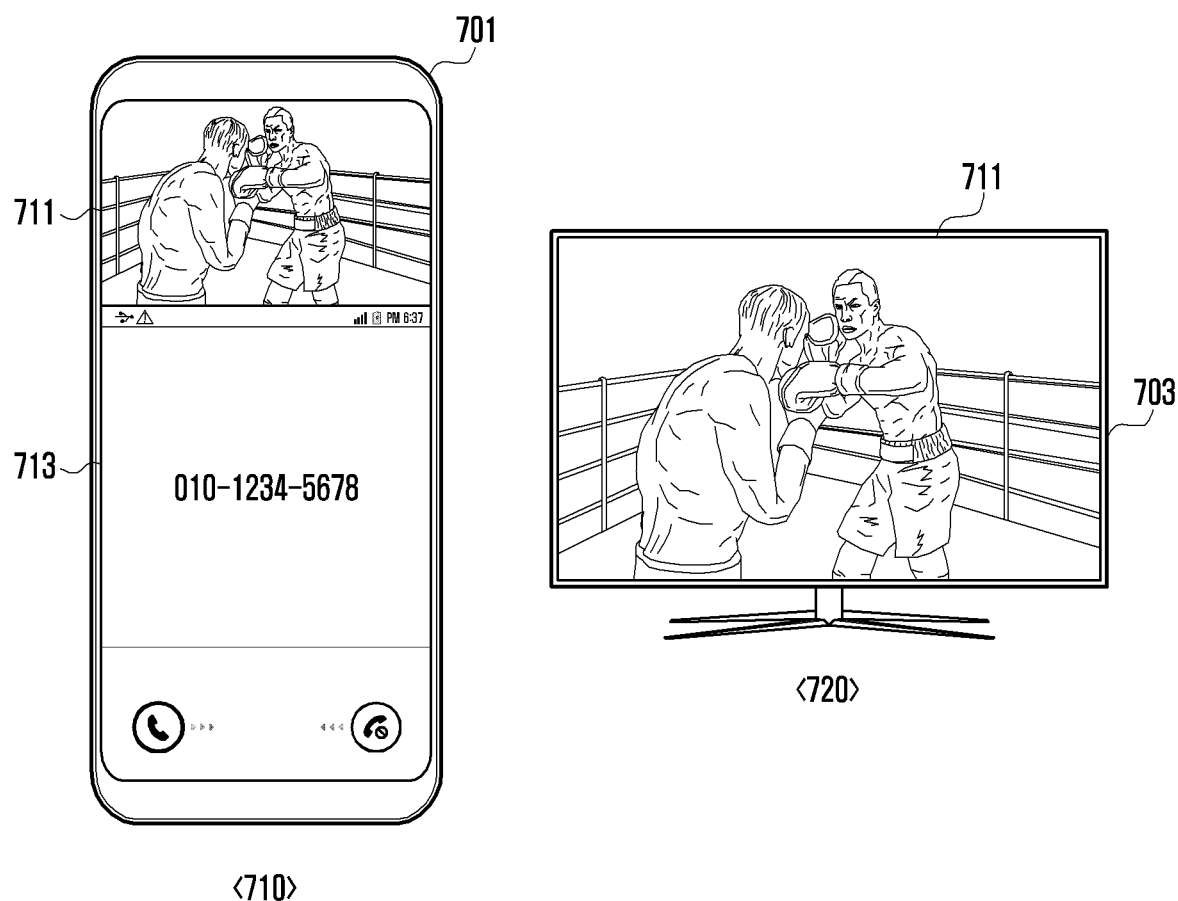
FIG. 7 illustrates a screen sharing method when a predetermined event is received while a screen sharing function is performed according to various embodiments of the disclosure.

FIG. 7 illustrates a screen sharing method when a predetermined event is received while a screen sharing function is performed according to various embodiments of the disclosure.

FIG. 7 described below illustrates the case in which a predetermined event (for example, a call event) is received in the state in which a first screen 711 displayed on a touch screen display (for example, the touch screen display 240 of FIG. 2) of an electronic device 701 (for example, the electronic device 200 of FIG. 2) and a first audio signal corresponding to the first screen 711 are shared with an external electronic device 703 (for example, the external electronic device 270 of FIG. 2).

Referring to FIG. 7, the electronic device 701 may receive a call event in the state in which the first screen 711 and the first audio signal corresponding to the first screen 711 are shared with the external electronic device 703 as indicated by reference numeral 710. If the call event is received, the electronic device 701 may display the first screen 711 and a second screen 713 informing of reception of the call event on the touch screen display in a multi-window form (or a popup window form).

According to an embodiment, the electronic device 701 may display the second screen 713 on the touch screen display and transmit a notification of the call event to the external electronic device 703. For example, the electronic device 701 may transmit at least one of a message and an audio signal (for example, ringtone) informing of the reception of the call event to the external electronic device 703.

According to an embodiment, if a call function is performed according to the reception of the call event, the electronic device 701 may transmit the first screen 711 which is being shared, control a volume of the first audio signal corresponding to the first screen 711, and transmit the first audio signal to the external electronic device 703.

According to an embodiment, the external electronic device 703 may display the first screen 711 received from the electronic device 701 on the display, output the first audio signal of which the volume is controlled, and output at least one of a message and a ringtone informing of the reception of the call event.

According to an embodiment, as the electronic device 701 transmits the first audio signal of which the volume is controlled to the external electronic device 703, an environment convenient for the call function may be provided to a user. Further, since the user is able to perform the call function through the electronic device 701 while watching the first screen 711 being shared with the external electronic device 703, thereby seamlessly performing the two functions.

According to an embodiment, the electronic device 701 may accept the call event and further display a menu for outputting an audio signal according to the call function to the external electronic device 703 or a menu for outputting an audio signal according to the call function through a receiver of the electronic device 701.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that the singular form of a noun may also refer to the plural, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together. As used herein, such terms as "1st" and "2nd," or "first" and "second" may refer to corresponding components without implying an order of importance, and are used merely to distinguish each component from the others without unduly limiting the components. It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly via a wire, wirelessly, or via a third element.

As used herein, the term "module" may include a unit implemented in hardware, software, or firmware, and may interchangeably be used with other terms, for example, "logic," "logic block," "part," or "circuitry." A module may be a single integral component or a part thereof adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., a computer). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include code made by a complier or code executable by an interpreter. The machine-readable storage medium may be provided in the form of a non-transitory storage medium. The term "non-transitory" simply means that the storage medium is a tangible device and does not include a signal (e.g., an electromagnetic wave). However this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuit;
a touch screen display;
an audio processing circuit;
a memory; and
a processor electrically connected to the communication circuit, the touch screen display, the audio processing circuit, and the memory,
wherein the processor is configured to:
display a first screen and a second screen on the touch screen display,
recognize an external electronic device connected through the communication circuit when a first input for performing a screen sharing function is detected through the touch screen display,
display a first interface for setting a screen to be shared with the recognized external electronic device among the first screen and the second screen,
detect a second input for setting the first screen as a screen to be shared with the recognized external electronic device in the first interface,
display a second interface for setting an audio signal to be shared with the recognized external electronic device among audio signals corresponding to the first screen and the second screen in response to detecting the second input,
detect a third input for setting a second audio signal corresponding to the second screen among the audio signals in the second interface as the audio signal to be shared with the recognized external electronic device, transmit the first screen and the second audio signal corresponding to the second screen to the recognized external electronic device, in response to detecting the third input, and output, while displaying the first screen and the second screen on the touch screen display, a first audio signal corresponding to the first screen through the audio processing circuit; and wherein the second interface sets the audio signal to the recognized external electronic device with a single point touch input and wherein the third input is the single touch point input.

2. The electronic device of claim 1, wherein the processor is configured to display a menu for controlling attributes of the first screen transmitted to the external electronic device in an area in which the first screen of the touch screen display is displayed.

3. The electronic device of claim 1, wherein, when a gesture for switching the first screen and the second screen displayed on the touch screen display is detected through the touch screen display, the processor is configured to stop transmitting the first screen and the second audio signal and transmit the second screen among the first screen and the second screen and the first audio signal among the audio signals to the external electronic device through the communication circuit.

4. The electronic device of claim 1, wherein, when a predetermined event is received through the communication circuit while the first screen and the second audio signal are transmitted, the processor is configured to transmit a notification of the received predetermined event to the external electronic device, and when a function corresponding to the received predetermined event is performed, control the first screen or the second audio signal, based on the received predetermined event.

5. The electronic device of claim 1, wherein the processor is configured to transmit an audio signal determined based on a type of an application corresponding to the first screen to the external electronic device.

6. The electronic device of claim 1, wherein the recognized external electronic device includes a plurality of external electronic devices, wherein the processor is configured to determine at least one screen and at least one audio signal to be shared with the plurality of respective external electronic devices and transmit the at least one determined screen and the at least one determined audio signal to the plurality of respective external electronic devices.

7. A method of sharing a screen by an electronic device, the method comprising:

displaying a first screen and a second screen on a touch screen display;

when a first input for performing a screen sharing function is detected through the touch screen display, recognizing an external electronic device connected through a communication circuit;

displaying a first interface for setting a screen to be shared with the recognized external electronic device among the first screen and the second screen;

detecting a second input for setting the first screen as a screen to be shared with the recognized external electronic device in the first interface;

displaying a second interface for setting an audio signal to be shared with the recognized external electronic device among audio signals corresponding to the first screen and the second screen in response to detecting the second input;

detecting a third input for setting a second audio signal corresponding to the second screen among the audio signals in the second interface as the audio signal to be shared with the recognized external electronic device;

transmitting the first screen and the second audio signal corresponding to the second screen to the recognized external electronic device, in response to detecting the third input; and outputting, while displaying the first screen and the second screen on the touch screen display, a first audio signal corresponding to the first screen through an audio processing circuit; and wherein the second interface sets the audio signal to the recognized external electronic device with a single point touch input and wherein the third input is the single touch point input.

8. The method of claim 7, further comprising displaying a menu for controlling attributes of the first screen transmitted to the external electronic device in an area in which the first screen of the touch screen display is displayed.

9. The method of claim 7, further comprising:

detecting a gesture for switching the first screen and the second screen displayed on the touch screen display; and stopping transmitting the first screen and the second audio signal and transmitting the second screen among the first screen and the second screen and the first audio signal among the audio signals to the external electronic device through the communication circuit in response to the gesture for switching the first screen and the second screen.

10. The method of claim 7, further comprising:

receiving a predetermined event through the communication circuit while the first screen and the second audio signal are transmitted;

transmitting a notification of the received predetermined event to the external electronic device; and when a function corresponding to the received predetermined event is performed, controlling the first screen or the second audio signal, based on the received predetermined event.

11. The method of claim 7, further comprising:

when a number of connected external electronic devices is plural, determining at least one screen and at least one audio signal to be shared with a plurality of respective external electronic devices; and transmitting the at least one screen and the at least one audio signal to be shared with the plurality of respective external electronic devices.

* * * * *